United States Patent [19]

Mason

[11] Patent Number: 4,986,900
[45] Date of Patent: Jan. 22, 1991

[54] SECTIONAL SCREEN CYLINDER

[75] Inventor: Chauncey Mason, Bolton Landing, N.Y.

[73] Assignee: A. Ahlstrom Corporation, Karhula, Finland

[21] Appl. No.: 332,737

[22] Filed: Apr. 4, 1989

[51] Int. Cl.⁵ .......................... B07B 1/46; B07B 1/18; B01D 39/00
[52] U.S. Cl. .................... 209/397; 209/273; 209/406; 209/931; 210/497.01; 264/DIG. 70
[58] Field of Search ............... 209/270, 273, 288, 289, 209/292, 300, 303, 305, 392, 397–399, 405–408, 664, 931; 210/380.1, 402, 497.01, 498; 264/DIG. 70

[56] References Cited

U.S. PATENT DOCUMENTS

| | | | |
|---|---|---|---|
| 1,331,587 | 2/1920 | Shevlin | 209/273 |
| 3,134,733 | 5/1964 | Rose | 209/393 |
| 4,190,527 | 2/1980 | Spiller | 209/392 X |
| 4,374,729 | 2/1983 | Frykhult | 210/402 X |
| 4,430,221 | 2/1984 | Spiewok | 209/406 X |
| 4,529,520 | 7/1985 | Lampenius | 209/397 X |

FOREIGN PATENT DOCUMENTS 3508889 3/1986 Fed. Rep. of Germany ...... 209/154

OTHER PUBLICATIONS

"Profiled Screens Remove Stickies, Cut Rejects, Plugs, Fractionation, Wear", Frey Frejborg, Pulp and Paper, Mar. 1986.

*Primary Examiner*—Margaret A. Focarino
*Assistant Examiner*—Edward M. Wacyra
*Attorney, Agent, or Firm*—Nixon & Vanderhye

[57] ABSTRACT

A screen cylinder is made up of a plurality of identical ceramic elements in arcuate form having screen openings, and opposite longitudinally extending edges carrying a tongue and groove, respectively. The elements are joined one to the other along their edges by inserting the tongues into the grooves to form a complete cylinder. Different diameter and lengths of screen cylinders may be formed by varying the number of elements in each closed arrangement of elements, and the closed arrangements may be disposed end-to-end with an intermediate connecting ring between them. End rings are provided to maintain the elements in a generally cylindrical configuration. Cinch rods connected between the end rings and under tension subject the elements in assembly to axial compression.

38 Claims, 3 Drawing Sheets

4,986,900

SECTIONAL SCREEN CYLINDER

BACKGROUND AND SUMMARY OF THE INVENTION

The present invention relates to screen cylinders, particularly of the type intended for use in screening cellulosic materials, for example, in the paper and pulp industry, and particularly relates to a perforated screen cylinder formed of a ceramic or other formed materials, such as graphite or plastic, and methods of constructing the screen cylinder.

Cylindrical perforated screens have long been employed in the paper and pulp industry for cleaning the pulp of impurities, for example, fiber bundles, sticks and other coarse particles. When using cylindrical screens to accomplish this, a pressure difference is maintained between the feed or inlet on one side of the screen and an accept region on the opposite side of the screen such that the accepts are passed through apertures in the screen for collection and the rejects are maintained on the inlet side of the screen for flow to a reject discharge.

Screens of this type have been made of high wear-resistant steel material, occasionally using an investment casting process. Obviously, this has led to great expense in the manufacture of screen cylinders. Particularly, such process does not lend itself to ready formation of screen cylinders of different diameters and lengths inasmuch as entirely new molds must be provided for each change in dimension or configuration. For these and other reasons, it has been found desirable, according to the present invention, to use a ceramic or other formed type of material in the formation of the cylindrical screen. In certain applications, a ceramic material is the material of choice, principally because of its high resistance to wear, lubricity and other characteristic properties. It has also been found desirable to provide screens of this type in a number of different sizes, i.e., diameters, and lengths for different screening apparatus and applications, and also in different configurations, all from a plurality of a single basic cylindrical screen section or element.

According to the present invention, identical screen cylinder sections or elements are formed of a ceramic material or other formable materials. This application describes a preferred embodiment of screen cylinder, namely a ceramic screen cylinder, but it will be appreciated that the invention has applicability to other types of materials for forming the cylinders, e.g., such as graphite, plastic and the like. Various numbers of the elements may be joined one to the other to form screen cylinders of different diameters and lengths, and hence different configurations. That is, a single basic element may be formed of predetermined size and configuration and joined with other identical elements to form screen cylinders of different sizes. Forming a plurality of identical elements, particularly of a ceramic material, is much less expensive in comparison with the expense necessary to manufacture steel screen cylinders of different diameters and lengths as in the prior art. To accomplish the foregoing, the present invention provides a plurality of identical, generally arcuate, elements, for example, each formed of a ceramic material. Each element has a plurality of screen openings or apertures therethrough and is joined to adjacent elements along opposite longitudinally extending edges to form a cylinder. While preferably each ceramic section or element has either or both of its interior or exterior surface in the configuration of an arc of a circle, it will be appreciated that one or both of the interior and exterior surfaces may be formed coincident with chords of a circle or may both be formed of arcs of concentric circles of different diameters.

In accordance with one aspect of the present invention, the elements are provided with interconnecting means along their longitudinally extending edges which enable these sections to pivot slightly relative to one another about an axis passing through the interconnecting means. This enables a plurality of the elements to be joined one with the other along their longitudinal edges to accommodate each element's use in screen cylinders of different diameters. That is, cylindrical screens of different sizes may be formed by employing a greater or lesser number of the identical elements and joining them one to the other along the longitudinally extending edges, the pivotal connection along the edges accommodating the increase or decrease in diameter of the particular screen cylinder being formed in comparison with a screen cylinder of a median diameter for screen cylinders of that type.

Preferably, the interconnecting means along the longitudinal edges are in the form of tongue and grooves. In this manner, the elements may be joined one to the other by sliding one element relative to another element with its tongue or groove engaging the complementary groove or tongue, respectively, of the adjacent element, there being sufficient play when the tongue-and-groove connection is effected such that the one element is pivotal relative to the other element about an axis generally parallel to the axis of the screen cylinder. When the elements are connected one to the other to form the cylinder, connecting rings are provided at opposite ends to maintain the elements connected one to the other and to maintain the screen in its cylindrical shape.

To provide screen cylinders of different lengths, each of the elements may be cast of a predetermined length and two or more generally cylindrical sets, each comprised of a plurality of such elements, may be disposed endwise relative to one another. A connector ring is disposed therebetween connecting the two sets of cylindrical elements in end-to-end relation.

In screen cylinders used in the pulp and paper industry, the walls of the cylinder are alternately flexed inwardly and outwardly by rotor induced pressure forces. Therefore, to accommodate this cyclical force, cinch rods are provided in the present invention about the sectional cylinder at circumferentially spaced positions and connected to the end connecting rings to place the elements under axial compression such that the cyclical forces will not exceed the compressive forces induced by the tensioned cinch rods.

Further, to prevent collapse or other damage to the cylinder in the event one or more of the elements is damaged or collapses, a support tube is provided, preferably about each cinch rod. Under normal operating conditions, an end of each tube is slightly axially spaced from the associated connecting ring, leaving a slight clearance space. Upon collapse of an element, the tensioned cinch rod draws the end connecting rings toward one another with the result that the tube ends butt the connecting rings, preventing further axial movement of the connecting rings toward one another.

In a preferred embodiment of the present invention, there is disclosed an apparatus for forming a screen cylinder comprising a plurality of generally arcuate elements formed of a ceramic material and having spaced opposite edges. Means are provided defining screen openings in each element and additional means interconnect the elements one with the other along their edges to form a substantially continuous screen cylinder.

In a further preferred embodiment in accordance with the present invention, there is disclosed apparatus for forming a screen cylinder having an axis comprising a plurality of generally arcuate elements formed of a ceramic material, each having spaced opposite edges extending generally in the direction of said axis. Means are provided which define screen openings through each element and additional means interconnect the elements one with the other along their edges to form a substantially continuous screen cylinder. The inner or outer surface of each element has a predetermined radius of curvature, the elements, in one assembly of a predetermined number of the elements, forming a generally continuous screen cylinder of one diameter, and, in another assembly of a predetermined number of elements and with one or more additional or one or more fewer elements forming a generally continuous screen cylinder of a larger or smaller diameter, respectively.

In a still further preferred embodiment of the present invention, there is disclosed a screen cylinder having an axis comprising a plurality of generally arcuate elements each having spaced opposite edges extending generally in the direction of said axis. Means are provided defining screen openings through each element and additional means interconnect the elements one with the other along their edges to form a substantially continuous screen cylinder, the inner or outer surface of each element having a predetermined curvature about an axis parallel to and not coincident with the axis of said cylinder.

In a still further preferred embodiment of the present invention, there is provided a method for constructing a screen cylinder having an axis comprising the steps of casting from a ceramic material a plurality of arcuate elements, each having substantially opposite edges extending generally in the direction of the axis and screen openings therethrough, and joining the elements together along said edges to form a substantially continuous screen cylinder.

Accordingly, it is a primary object of the present invention to provide a novel and improved screen cylinder for use in the pulp and paper industry and methods of forming the screen cylinder wherein the cylinder is formed of a ceramic or other formable material and may be readily and easily constructed of identical elements in different screen diameters, lengths and configurations.

These and further objects and advantages of the present invention will become more apparent upon reference to the following specification, appended claims and drawings.

BRIEF DESCRIPTION OF THE DRAWING FIGURES

DETAILED DESCRIPTION OF THE DRAWING FIGURES

Reference will now be made in detail to the present preferred embodiment of the invention, an example of which is illustrated in the accompanying drawings.

Figure 1:
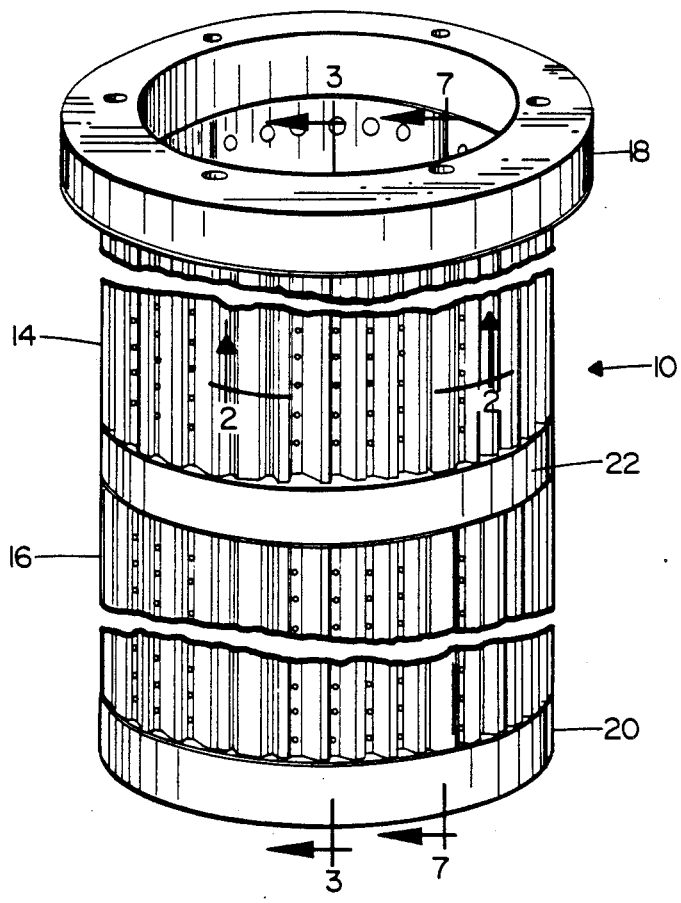
FIG. 1 is a perspective view, with parts broken out for ease of illustration, of a ceramic screen cylinder constructed in accordance with the present invention.

Referring now to FIG. 1, there is illustrated a screen cylinder generally designated 10 and constructed in accordance with the present invention. Generally, screen cylinder 10 is formed of a plurality of arcuate elements, generally designated 12 (FIG. 2), joined one to the other along longitudinally extending edges, that is, edges which extend generally parallel to the axis of the cylinder 10, to form a screen enclosure. In the embodiment illustrated in FIG. 1, a predetermined number of elements 12 have been secured along their longitudinal edges to form a first generally cylindrical set 14 of elements 12 disposed in end-to-end relation with respect to a second generally cylindrical set 16 of elements 12 joined one to the other along their longitudinally extending edges. Opposite ends of the cylindrical screen 10 are provided with connecting rings 18 and 20, respectively, and the sets 14 and 16 are interconnected endwise one with the other by an intermediate connecting ring 22, the details of which will be discussed hereinafter. It will be appreciated, however, that only one set of elements 12 may be employed to form a screen cylinder and that one or more additional sets of generally cylindrically arranged elements 12 may be used where it is desired to form screen cylinders of increased length in comparison with the length of a screen cylinder using a single set of elements 12.

Figure 2:
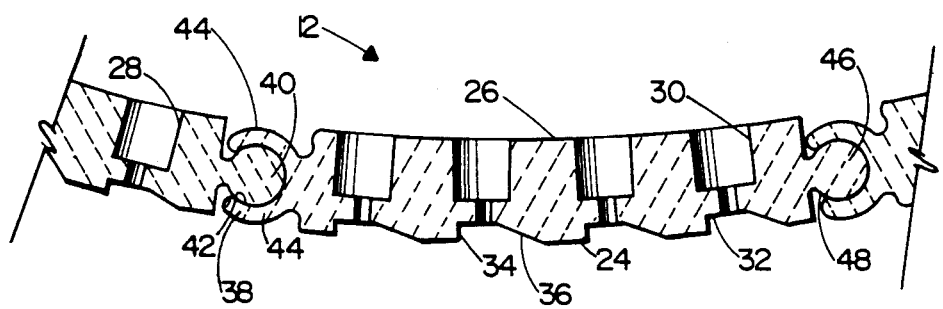
FIG. 2 is an enlarged cross-sectional view illustrating the juncture of several of the elements forming the screen cylinder of FIG. 1 and generally taken about on line 2—2 in FIG. 1.

Referring now to FIG. 2, each of the elements 12 is preferably formed of a ceramic material, for example, alumina oxide, although it will be appreciated that other formed materials such as graphite or plastic may be used. It is therefore a feature of this invention that the screen cylinder can be formed from elements 12 that, with the exception of the end connecting rings 18 and 20, are solely of a highly wear-resistant formed material such as ceramic material. Additionally, it will be noted that each element 12 is identical to each other element 12 whereby an identical mold may be used to form each element 12. It will also be appreciated that by forming the elements 12 identically one to the other, screen cylinders of different diameters and different lengths may be provided, as discussed hereinafter.

Referring now to FIG. 2, each element 12, formed of ceramic material, is provided with a shaped, generally arcuate, outer surface 24 on the inlet side thereof and a generally arcuate surface 26 on the outlet side thereof. The reference to outlet and inlet refers to the accepts and rejects sides of the screen cylinder, respectively. A plurality of screen apertures or openings 28 are provided through the elements 12 at circumferential and longitudinal spaced positions therealong. The screen openings 28 open on the inside surface in enlarged openings 30 and open along the outside surface 24 in shaped grooves 32. Preferably, the grooves are shaped to provide side walls 34 and 36, the latter wall being inclined in a direction away from the screen opening 28, generally as illustrated in U.S. Pat. No. 4,529,520 (the disclosure of which is hereby incorporated by reference herein). It will be appreciated that the contoured or shaped inlet side 24 and the relatively smooth outlet side 26 may be reversed such that the contoured and smooth sides lie on inside and outside surfaces of the screen cylinder, respectively. In this latter form, the flow is from inside the cylinder outwardly through openings 28 with the rejects accumulating on the contoured inside surface and the accepts along the outer surface.

Figure 4:
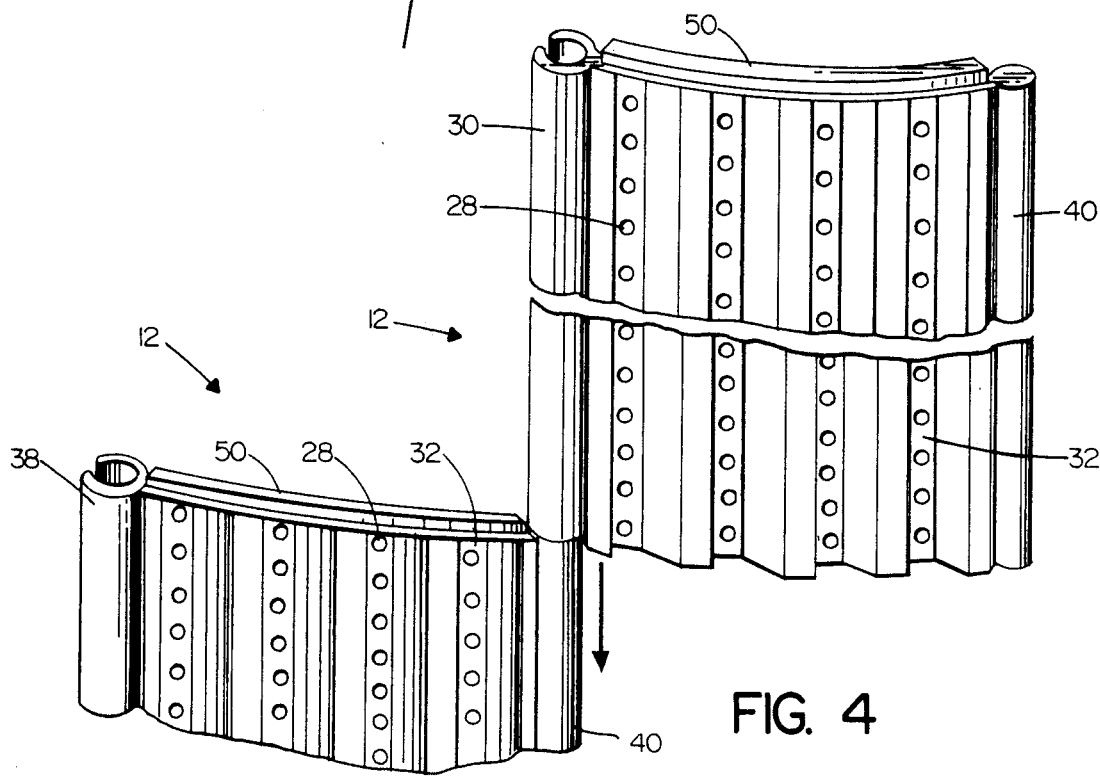
FIG. 4 is a perspective view of two of the arcuate elements forming the screen cylinder hereof in a phase of their assembly one with the other.

As illustrated in FIGS. 2 and 4, the opposite longitudinal edges 38 and 40, respectively, comprise means for joining the edges of adjacent elements 12 one to the other. Particularly, the edge 38 comprises a longitudinally extending, arcuate groove 42 formed by two arcuate opposing walls 44 spaced one from the other and extending substantially continuously and linearly along the longitudinal edge of element 12. The opposite edge 40 is formed by a longitudinally extending, preferably continuous, projecting tongue 46, which is complementary in shape to the groove 42. The tongue 46 is generally cylindrical in cross-section and has a shank portion 48 coextensive with tongue 46 and joining the tongue to the body of the element. From a review of FIG. 2, it will be appreciated that the distance between the distal ends of the walls 44 is greater than the width of the shank 48 whereby the tongue of one element may pivot relative to the groove of the other element about an axis passing through the tongue-and-groove connection in the general direction of the axis of the screen cylinder.

From a review of FIG. 2, it will be appreciated that the inside and outside surfaces 24 and 26, respectively, are generally circular and concentric about a common axis. However, it will be appreciated that the inside or outside surface, or both surfaces, may extend generally linearly from edge to edge, i.e., constitute the chords of a circle when the elements are disposed to form the screen cylinder.

In order to form a screen cylinder, the elements 12 are aligned with the tongue and groove of adjacent edges of adjacent elements disposed end-to-end. By sliding one element relative to the other element in a longitudinal direction, the tongue 46 may be received in the groove 38. For example, in FIG. 4, the righthand element 12 may be displaced in the direction of the arrow to connect its grooved edge 38 with the tongue 46 of the edge 40 of the adjoining element 12 until the end edges of the elements register one with the other. Additional elements are similarly connected one to the other until a complete generally cylindrical screen is formed.

Figure 3:
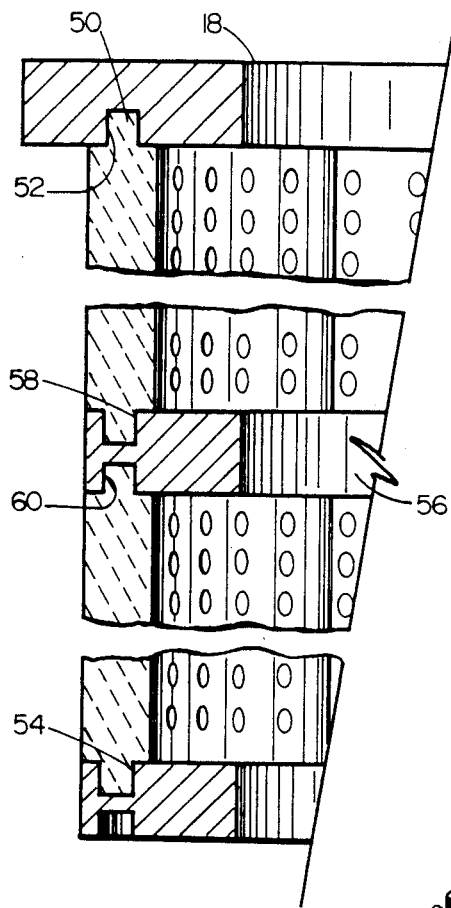
FIG. 3 is an enlarged fragmentary vertical cross-sectional view of the screen cylinder of FIG. 1 and taken generally about on line 3—3 in FIG. 1.

With reference to FIG. 3, means for maintaining the elements 12 in a generally cylindrical configuration are provided. Such means may comprise a ring 18 provided at each of the opposite ends of the screen cylinder. In a preferred form of the present invention, each element has a longitudinally projecting rib 50 (FIG. 4) at its opposite ends. Ring 18, as well as a bottom ring 20, each have grooves or recesses 52 and 54, respectively, for receiving the projecting ribs 50 of element 12. Consequently, when circular rings 18 and 20 are employed, the ribs 50 are received within the grooves 52 and 54, respectively, at opposite ends of the screen cylinder, thereby maintaining the elements in the form of a cylindrical screen cylinder.

To provide a screen cylinder of increased length employing the elements 12, two or more sets of elements may be disposed in generally cylindrical configuration similarly as described previously, with end connecting rings 18 and 20 maintaining those elements in such generally cylindrical configuration. The generally cylindrically arranged sets of elements may then be disposed end-to-end and joined one to the other by an intermediate connecting ring 56. As illustrated in FIG. 3, the intermediate connecting ring 56 is similar in cross-section to the cross-section of end rings 18 and 20 and has annular recesses or grooves 58 and 60, respectively, opening endwise to receive the end ribs 50 of the upper and lower sets of cylindrical screens.

Figure 5:
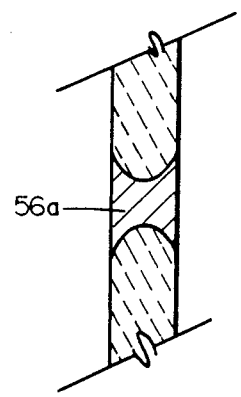
FIG. 5 is a fragmentary enlarged cross-sectional view of a further embodiment of the present invention.

Referring to FIG. 5, there is illustrated another embodiment of the connections between the elements and the rings. In this form, the rings, for example, intermediate ring 56a, may have annular concave grooves opening at its opposite ends to receive generally rounded or convex complementary-shaped, i.e., convex, upper and lower portions of the elements 20 comprising the two sets of screens. It will also be appreciated that the upper and lower connecting rings 18 and 20 may be provided with either concave or convex projections to receive complementary-shaped convex or concave projections on the elements.

As indicated previously, the walls of cylinders of the previously-described type used in the pulp and paper industry are alternately flexed inwardly and outwardly by rotor-induced pressure forces. That is, a rotor periodically passes the contoured side of the screen cylinder surface, whether the inside or the outside of the screen cylinder, depending upon the desired flow and the location of the contoured surface. Thus, to accommodate these cyclical forces, cinch rods are provided not only to maintain the cylinder in assembly but also to place the elements under axial compression such that the cyclical forces will not exceed the compressive forces induced by the tensioned cinch rods. More particularly, and with reference to FIG. 7, each cylinder 10 is provided with a plurality of circumferentially spaced cinch rods 70 which extend parallel to the axis of the cylinder and interconnect the opposite end rings 18 and 20 and, hence, all of the elements and rings therebetween. Each rod 70 may be screw-threaded at its lower end into the lowermost ring 20 and is received through an opening in upper ring 18, terminating in a recess 72. One or more Belville springs 74 may be disposed about the cinch rod 70 in recess 72 and a nut and washer 76 and 78, respectively, may be applied about the terminus of rod 70. By threading the nut 76 about the upper end of rod 70, a tensioning force is applied to cinch rod 70, compressing in an axial direction the elements 12 therebetween. While any number of cinch rods may be provided, as desired, preferably four are located at circumferentially spaced positions about the cylinder. Additionally, the cinch rods are provided on the smooth side of the cylinder so as not to interfere with the passage of the rotor operating on the opposite contoured side of the cylinder.

Figure 7:
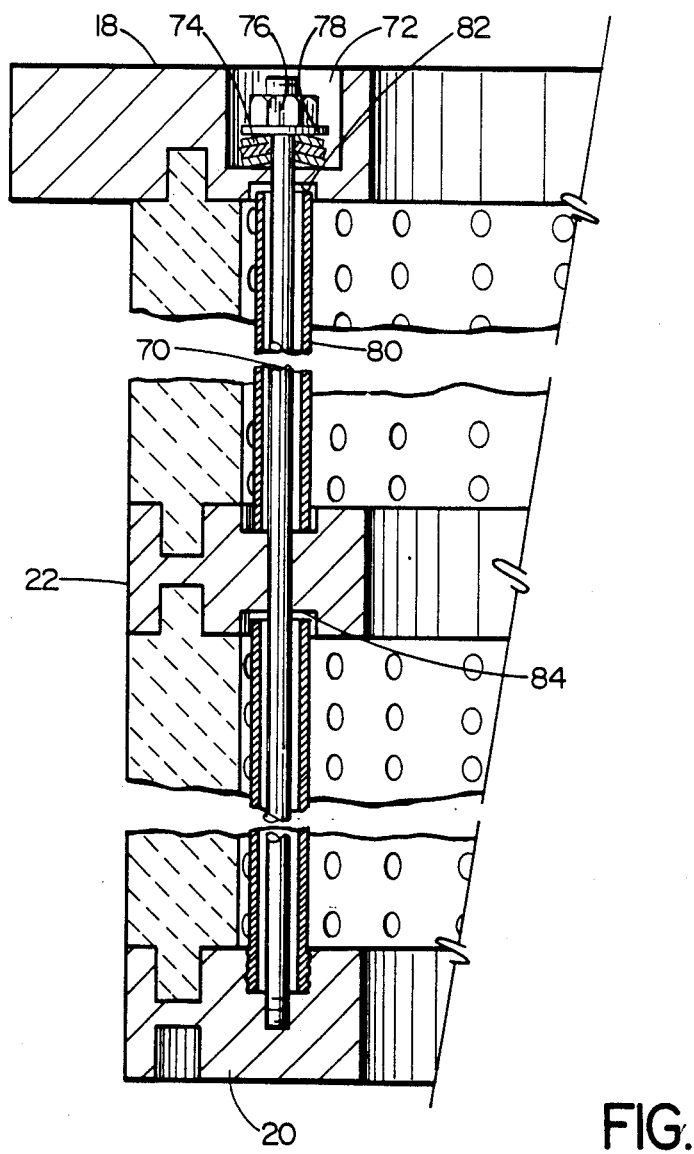
FIG. 7 is an enlarged fragmentary cross-sectional view of the screen cylinder illustrated in FIG. 1 and taken generally about on line 7—7.

To prevent collapse or damage to the cylinder in the event one or more of the elements is damaged or collapses, a support tube is provided about each cinch rod. With reference to FIG. 7, a support sleeve or tube 80 is freely disposed about the cinch rod 70 between the adjacent rings, in this case, two sleeves 80 being provided, one between ring 18 and intermediate ring 22 and another between intermediate ring 22 and lower ring 20. From a review of FIG. 7, it will be appreciated that the sleeve 80 butts or seats against a recessed portion of intermediate ring 22, while its opposite end is slightly spaced from a seat 82 disposed along the undersurface of ring 18. Likewise, the lower sleeve 80 interconnecting intermediate ring 22 and lower ring 20 is threaded at its lower end into ring 20 and its upper end is slightly spaced from a seat 84 formed along the underside of the intermediate ring 22. With the foregoing arrangement, the collapse of any one or more of the elements between the rings will cause the tensioned cinch rods 70 to draw the corresponding rings toward one another, with the result that the sleeve or tube 80 then butts the seat from which it was previously spaced. This abutting action prevents further collapse of the screen cylinder. It will be appreciated that it is necessary to provide a sleeve or tube 80 between each adjacent pair of rings for each axially spaced section of elements such that the collapse of any one element in any specified section enables the cinch rod to draw the corresponding ends of the rings for that section toward one another to the extent the sleeve 80 permits.

Preferably, and in accordance with a further aspect of this invention, the elements 12 have a curvature which, when a plurality of elements are joined along their opposite edges, form a screen cylinder which is of a median diameter of an expected range of diameters of screen cylinders desired. That is, screen cylinders may be provided in various diameters. In providing a mold for casting the elements 12 of ceramic material, the curvature of the mold is chosen such that a predetermined number of the elements joined along their edges one with the other form a general cylindrical configuration with the center of curvature for the circular inside and outside surfaces 26 and 24, respectively, lying coincident with the axis of the resulting screen cylinder. Consequently, this so-called median diameter screen cylinder may be formed of a predetermined number of identical elements 12 secured one to the other along their longitudinal edges with the axes of the cylinder and the arcuate inside and outside surfaces of the elements being coincident.

Figure 6A:
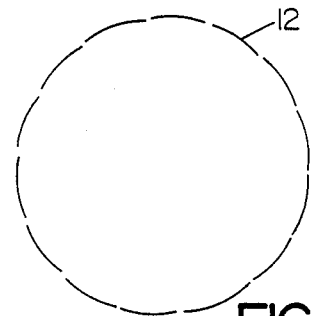
FIGS. 6A, 6B and 6C are schematic illustrations of screen cylinders of different sizes, respectively, formed by the interconnection of greater or lesser number of screen cylinder elements connected one to the other.
Figure 6B:
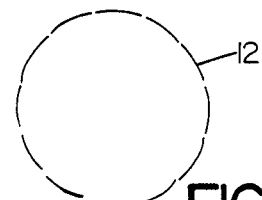
Figure 6C:
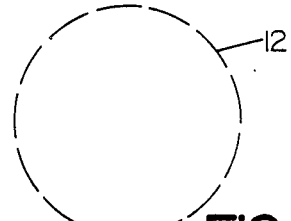

To form a screen cylinder of a larger than median diameter, it is necessary only to add one or more elements 12 to the predetermined number of elements forming the median diameter screen cylinder. To provide a screen cylinder of smaller than median diameter, a lesser number of elements than the predetermined number of elements forming the median diameter screen cylinder is used. For example, in FIG. 6C, there is formed a median diameter screen cylinder using, for example, thirteen elements connected one to the other along their longitudinal edges. Note that the curvature of the inside and outside faces of each element have axes which coincide with the axis of the cylinder. To provide a smaller diameter screen cylinder using identical elements 12, reference is made to FIG. 6B. In FIG. 6B, twelve elements are joined one to the other along their longitudinally extending edges. Thus, the circular inside and outside surfaces do not exactly coincide with imaginary circles defining the inside and outside surfaces of this smaller diameter cylinder. Rather, slight angles are formed between the adjoined edges of the elements. Similarly, to provide a larger diameter screen cylinder as illustrated in FIG. 6A, one or more identical elements in addition to the thirteen elements of the median diameter screen cylinders are added. For example, FIG. 6A illustrates fourteen arcuate elements 12 connected one to the other along their longitudinally extending edges. Here, again, the arcuate inside and outside surfaces of the elements do not have centers or axes which coincide with the axis of the generally cylindrical screen cylinder formed. Stated differently, the angle between the adjoining edges of the elements opens slightly in comparison with the angle between such elements in FIG. 6C.

However, if cylinders having a diameter significantly greater or less than the diameter of a cylinder in which the arcuate curve 26 is continuous from element to element, is desired, then elements 12 of different curvatures 26 will have to be provided.

Where larger or smaller screen cylinders in comparison with the median diameter screen cylinder are desired, the end connecting rings 18 and 20 and the intermediate connecting ring or rings 22, where two or more sets of rings, respectively, are disposed in end-to-end relation, may have enlarged grooves for receiving the ends of the elements. Alternatively, the rings 18, 20 and 22 may be specifically formed to each anticipated diameter and thus fit exactly the slightly non-circular configuration of the elements, for example, as illustrated in FIGS. 6A and 6B. It will be appreciated that the identification herein of a median cylinder being comprised of thirteen elements is for explanatory purposes only and that the elements therefor may be greater or lesser in number depending on the diameter of the desired screen or the arcuate extent of the identical elements or both.

It will also be appreciated that the elements are readily and easily formed of a highly wear-resistant ceramic material. Thus, the resistance to wear is substantially increased in comparison with prior screen cylinders formed of steel and even those having hardened surfaces.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. Apparatus for forming a screen cylinder comprising:
    a plurality of elements formed solely of a ceramic material and having spaced opposite first and second edges;
    means defining screen openings in each element; and
    means for interconnecting said elements one with the other along their edges to form a substantially continuous screen cylinder.

2. Apparatus for forming a screen cylinder according to claim 1 wherein said interconnecting means includes means along said first edges defining projecting ribs and means along said second edges defining recesses for receiving said ribs.

3. Apparatus for forming a screen cylinder according to claim 2 wherein said ribs are generally arcuate and said recesses are generally complementary in shape to said arcuate ribs.

4. Apparatus according to claim 2 wherein said ribs and said recesses extend substantially continuously along the opposite edges of said elements.

5. Apparatus for forming a screen cylinder according to claim 1 including means engageable with said elements for maintaining the elements in a configuration forming the screen cylinder.

6. A screen cylinder according to claim 5 wherein said elements are connected one to the other along their edges and form said screen cylinder, said engageable means including a ring connected to said elements at one end thereof to maintain said elements in a generally cylindrical screen configuration.

7. A screen cylinder according to claim 6 wherein said engageable means includes a second ring connected to said elements at the opposite end thereof to maintain said elements in a generally cylindrical screen configuration.

8. A screen cylinder according to claim 7 including means interconnecting said first and second end rings for maintaining said elements under compression in the general direction of the axis of the cylinder.

9. A screen cylinder according to claim 8 wherein said interconnecting means includes a plurality of cinch rods disposed at circumferentially spaced positions about said cylinder and having opposite ends thereof connected to said first and second rings, respectively.

10. A screen cylinder according to claim 9 including means disposed between said first and second rings for preventing movement of said end rings toward one another, said preventing means including a tube about each cinch rod and terminating at one end short of the associated end connecting ring to define a clearance space between the end of said tube and said associated end connecting ring whereby movement of said end connecting rings toward one another is prevented in response to engagement between said tube end and said associated end connecting ring.

11. A screen cylinder according to claim 8 including means disposed between said first and second rings for preventing movement of said end rings toward one another.

12. A screen cylinder according to claim 7 wherein said plurality of elements are arranged in two sets of elements disposed in generally cylindrical configurations and in end-to-end relation one to the other, said engageable means including a ring intermediate said two sets of said elements so that said intermediate ring maintains the elements of said sets of elements in a generally cylindrical configuration.

13. A screen cylinder according to claim 12 including means interconnecting said first and second end rings for maintaining said elements under compression in the general direction of the axis of the cylinder, said means being unconnected to said intermediate ring.

14. A screen cylinder according to claim 13 wherein said interconnecting means includes a plurality of cinch rods disposed at circumferentially spaced positions about said cylinder and having opposite ends thereof connected to said first and second rings, respectively, and passing freely through said intermediate ring, means disposed between said first and intermediate rings and said intermediate and second rings for preventing movement of said end rings toward said intermediate ring.

15. A screen cylinder according to claim 7 wherein said ring has one of a projecting rib or groove and corresponding ends of said elements have complementary projecting ribs or grooves whereby a rib and groove connection is formed between said elements and said ring.

16. Apparatus according to claim 1 wherein said edges extend generally linearly and substantially parallel to the axis of the screen cylinder.

17. Apparatus according to claim 1 wherein said elements extend generally arcuately between said opposite edges thereof.

18. Apparatus according to claim 1 wherein said interconnecting means includes means pivotally connecting adjacent edges of adjoining elements one to the other.

19. Apparatus according to claim 1 including means for maintaining said ceramic elements under compression in the general direction of the axis of said cylinder.

20. Apparatus according to claim 19 wherein the cylinder is subjected to predetermined cyclical inwardly and outwardly directed radial forces, said compression maintaining means applying compression forces of a magnitude such that the cyclical forces will not exceed said compression forces.

21. Apparatus according to claim 19 including means carried by said cylinder for preventing collapse of said cylinder in an axial direction in the event of a collapse of one of said elements in said screen cylinder.

22. Apparatus for forming screen cylinders of different diameters, each cylinder having an axis comprising:
a plurality of substantially identical, generally arcuate, elements formed of a ceramic material, each having spaced opposite edges extending generally in the direction of said axis;
means defining screen openings through each element; and
means for interconnecting said elements one with the other along their edges to form substantially continuous screen cylinders, the inner or outer surface of each said element having a predetermined radius of curvature, a first predetermined number of elements of said plurality of elements being assembled to form a first generally continuous screen cylinder of one diameter, and a second predetermined number of elements of said plurality of elements being assembled to form a second generally continuous screen cylinder of a larger or smaller diameter, respectively, in comparison with said first cylinder, said first and second predetermined numbers being different one from the other.

23. Apparatus according to claim 22 wherein each of said elements is formed solely of a ceramic material.

24. A screen cylinder having an axis comprising:
a plurality of generally arcuate elements each having spaced opposite edges extending generally in the direction of said axis;
means defining screen openings through each element; and
means interconnecting said elements one with the other along their edges to form a substantially continuous screen cylinder, the inner or outer surface of each said element having a predetermined curvature about an axis parallel to and not coincident with the axis of said cylinder.

25. A screen cylinder according to claim 24 wherein said elements are formed solely of a ceramic material.

26. A screen cylinder according to claim 24 including means engageable with said elements for maintaining the elements in a configuration forming the screen cylinder, said elements being connected one to the other along their edges and forming said screen cylinder, said engageable means including a ring connected to said elements at one end thereof to maintain said elements in a generally cylindrical screen configuration, said engageable means including a second ring connected to said elements at the opposite end thereof to maintain said elements in a generally cylindrical screen configuration.

27. A screen cylinder according to claim 26 including means interconnecting said first and second end rings for maintaining said elements under compression in the general direction of the axis of the cylinder, including means disposed between said first and second rings for preventing movement of said end rings toward one another.

28. Apparatus according to claim 24 including means for maintaining said elements under compression in the general direction of the axis of said cylinder.

29. A method of constructing a screen cylinder having an axis comprising the steps of:
casting from a ceramic material a plurality of elements each having opposite, generally parallel, edges and screen openings therethrough; and
joining the elements together along said edges to form a substantially continuous screen cylinder with the edges of the elements extending generally in the direction of said axis.

30. A method according to claim 29 including the step of moving said elements relative to one another in the general direction of said axis to join the edges one to the other thereby to form the screen cylinder.

31. A method according to claim 29 including casting longitudinally extending tongues and grooves along respective opposite edges of said elements and joining adjacent elements one to the other along adjoining edges by tongue and groove connections.

32. A method according to claim 31 including pivoting said elements relative to one another each about a pivotal axis parallel to the axis of the screen cylinder and passing through a respective groove of the tongue and groove connections to assemble the elements to form said screen cylinder.

33. A method according to claim 29 wherein the step of casting includes casting elements having at least one surface extending between said opposite edges of a generally arcuate configuration having an axis of revolution, in assembly with other identical elements forming the screen cylinder, generally coincident with the axis of the screen cylinder.

34. A method according to claim 29 including the step of subjecting said elements when joined to form the screen cylinder to compressive forces in the general direction of the axis of said cylinder.

35. A method according to claim 29 wherein the step of casting includes casting elements having at least one surface extending between opposite edges of a generally arcuate configuration having an axis of revolution, and joining said elements with other identical elements to form a screen cylinder having said axes of revolution generally parallel to and offset from the axis of said screen cylinder.

36. A method according to claim 29 wherein the cylinder is subjected to predetermined cyclical inwardly and outwardly directed radial forces, including the step of subjecting said elements when joined to form the screen cylinder to compression forces in the general direction of the axis of the cylinder and of a magnitude such that the cyclical forces do not exceed the compression forces.

37. Apparatus for forming a screen cylinder comprising;
a plurality of elements formed of a ceramic material and having spaced opposite first and second edges;
means defining screen openings in each element;
means for interconnecting said elements one with the other along their edges to form a substantially continuous screen cylinder;
said interconnecting means including means along said first edges defining generally arcuate projecting ribs and means along said second edges defining recesses generally complementary in shape to said arcuate ribs;
the ribs and recesses being interconnected one with the other, each said interconnected rib and recess forming a pivotal connection therebetween enabling relative pivotal action between the adjoining elements about a pivot axis generally parallel to the axis of the cylinder.

38. Apparatus for forming a screen cylinder according to claim 37 wherein each said pivotal axis extends through a respective recess.

* * * * *